No. 769,838. PATENTED SEPT. 13, 1904.
W. H. SAUVAGE.
AUTOMATIC AIR BRAKE MECHANISM FOR CARS.
APPLICATION FILED OCT. 25, 1902. RENEWED JAN. 19, 1904.
NO MODEL. 3 SHEETS—SHEET 1.
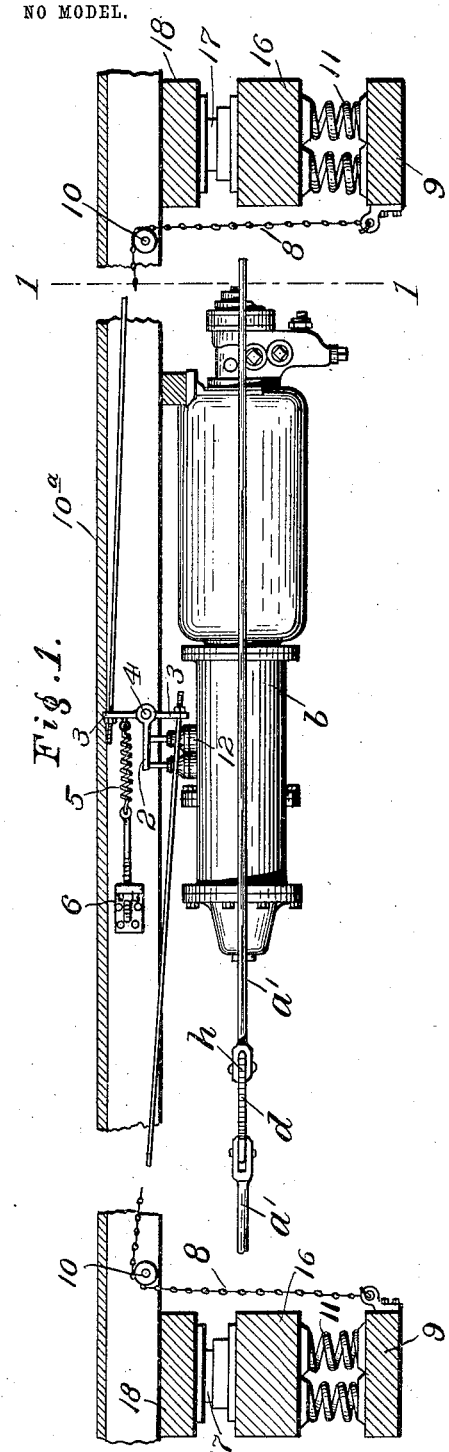
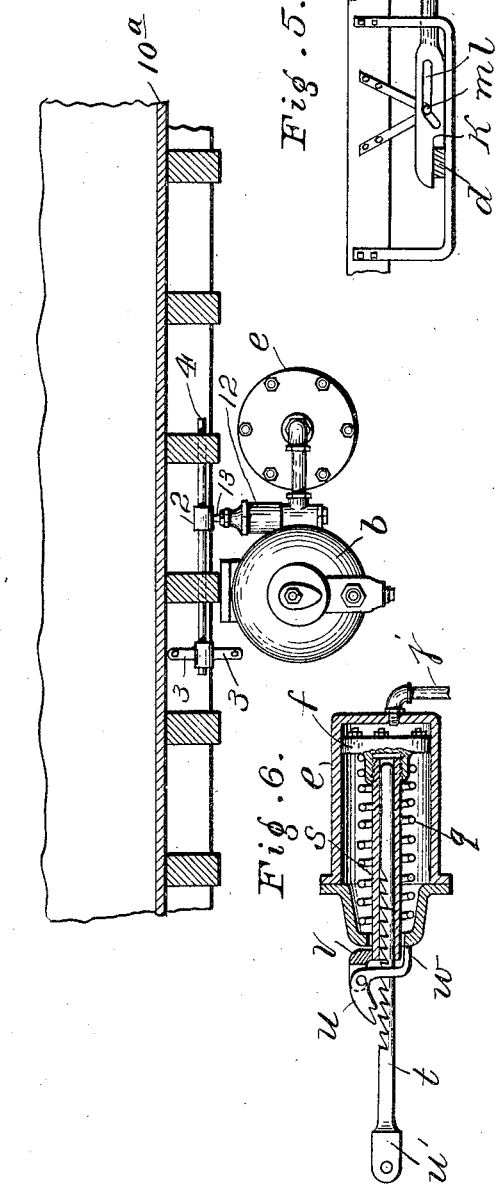
Witnesses
C. Sedgwick
J. M. Howard
Wm. H. Sauvage
Inventor
By his Attorney A. P. Mayer

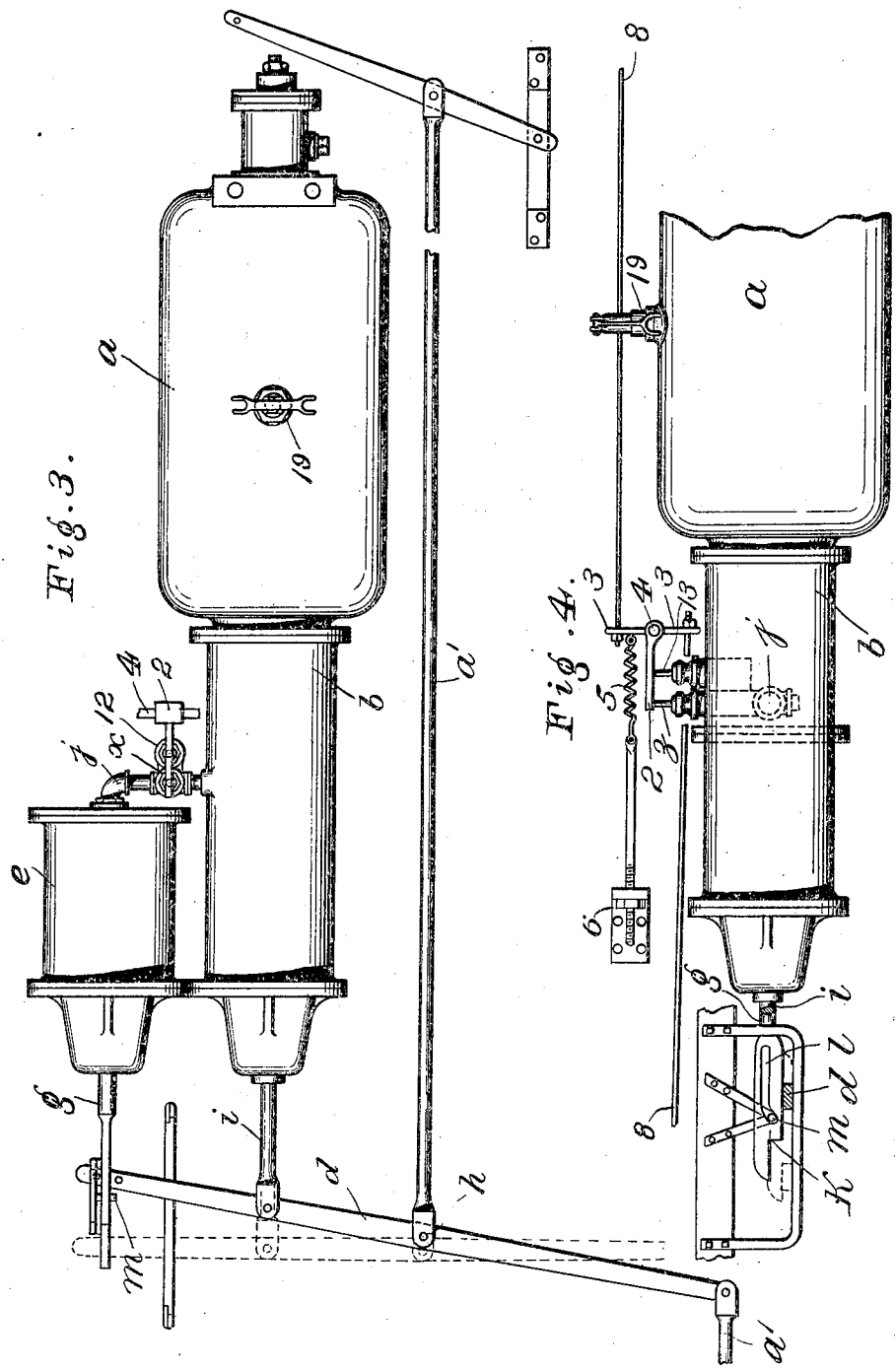

No. 769,838. PATENTED SEPT. 13, 1904.
W. H. SAUVAGE.
AUTOMATIC AIR BRAKE MECHANISM FOR CARS.
APPLICATION FILED OCT. 25, 1902. RENEWED JAN. 19, 1904.
NO MODEL. 3 SHEETS—SHEET 3.
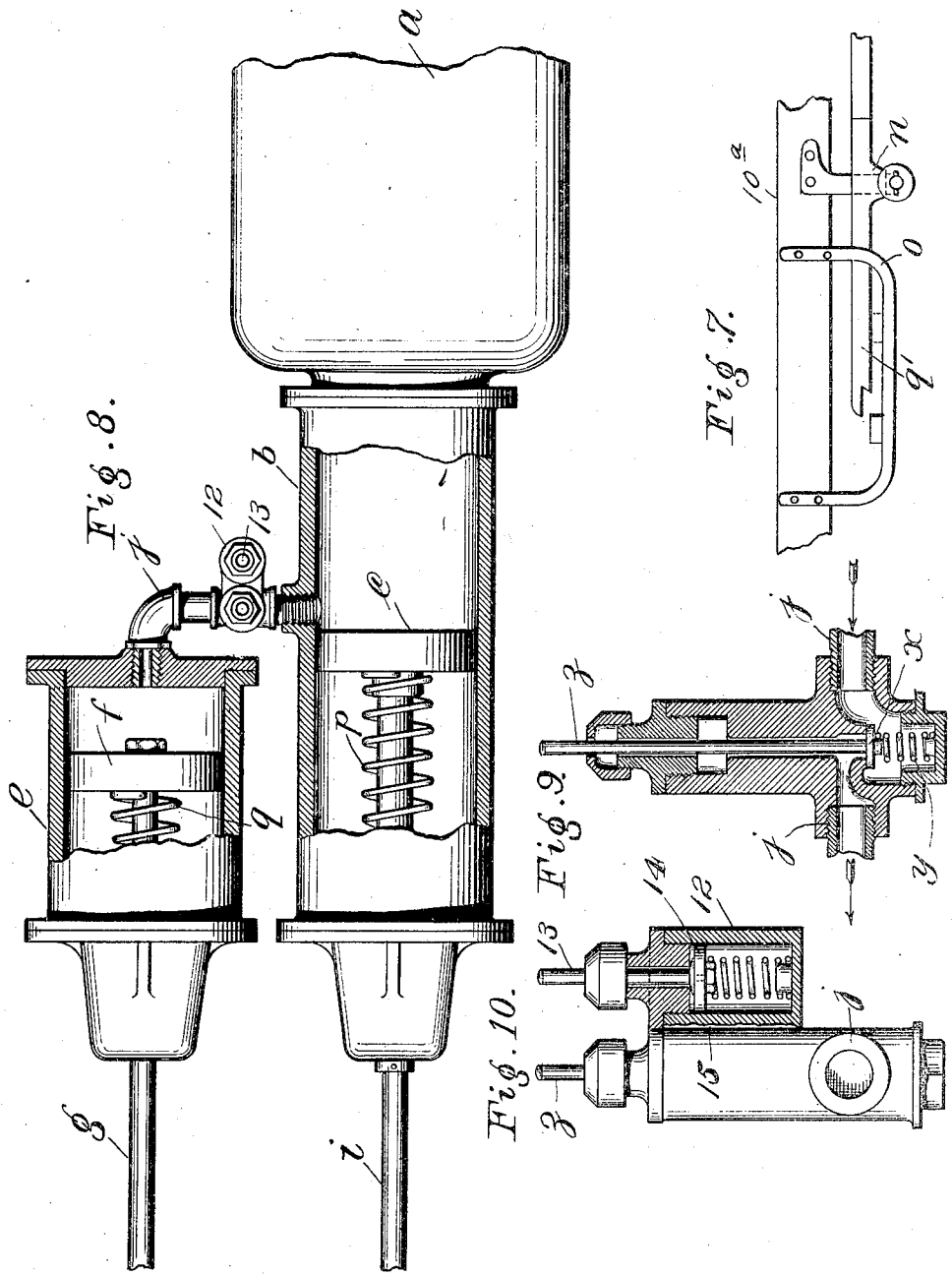

No. 769,838. Patented September 13, 1904.

UNITED STATES PATENT OFFICE.

WILLIAM H. SAUVAGE, OF NEW YORK, N. Y., ASSIGNOR OF FIFTY-ONE TWO-HUNDREDTHS TO GEORGE F. KISSAM, OF NEW YORK, N. Y.

AUTOMATIC AIR-BRAKE MECHANISM FOR CARS.

SPECIFICATION forming part of Letters Patent No. 769,838, dated September 13, 1904.

Application filed October 25, 1902. Renewed January 19, 1904. Serial No. 189,756. (No model.)

*To all whom it may concern:*

Be it known that I, WILLIAM H. SAUVAGE, a citizen of the United States of America, and a resident of New York city, county and State of New York, have invented certain new and useful Improvements in Automatic Air-Brake Mechanism for Cars, of which the following is a specification.

One object of this invention is to provide means for applying to the car-wheels a braking force proportioned to the variations of the load upon the car-trucks.

A further object is to provide for the application of a braking force additional to the normal braking force only during the latter part of the normal operation of the brakes.

The invention and the objects thereof will be more fully explained hereinafter with reference to the accompanying drawings, in which various convenient and practical embodiments of the invention are illustrated, and in which—

Figure 1 represents my improved brake apparatus in side elevation with some parts of the car in longitudinal vertical section. Fig. 2 represents a vertical transverse section of part of the car and an end elevation of the essential parts of the brake apparatus, the section of the car being taken at the line 1 1 or thereabout of Fig. 1. Fig. 3 is a plan view of the apparatus unattached to the car. Fig. 4 is a side elevation of the principal parts of the brake apparatus, on a larger scale than in Fig. 1, including details of apparatus for bringing the auxiliary brake cylinder and piston into action. Fig. 5 is a side elevation of said apparatus for bringing said auxiliary brake cylinder and piston into action, showing said apparatus in engagement with the brake-actuating lever. Fig. 6 is a longitudinal vertical section of the auxiliary brake cylinder and piston with a modification of the connecting devices for connecting the piston with the brake-lever. Fig. 7 is a side elevation of another modification of the auxiliary brake-piston and brake-lever engaging devices. Fig. 8 is partly a plan view and partly a horizontal section of the usual brake-cylinder and auxiliary compressed-air reservoir and the auxiliary brake-cylinder of my improvement. Fig. 9 is a vertical section of a controlling-valve governing the auxiliary brake cylinder and piston. Fig. 10 is a side elevation of said controlling-valve and a vertical section of a dash-pot employed in connection with said valve to graduate its action.

The usual auxiliary compressed-air reservoir $a$, brake-cylinder $b$, piston $c$, and brake-lever $d$ are employed, also the usual triple-valve and train-pipe systems, which being well understood and not modified in any way it is unnecessary to show and describe. The brake-lever $d$ is also connected, as usual, by rods $a'$ and other common devices with the brake-levers not shown Alongside of the brake-cylinder $b$ I arrange an auxiliary brake-cylinder $e$ and piston $f$ in such relation that the piston-rod $g$ may connect with the brake-lever $d$ at a greater distance from the fulcrum $h$ than the connection of rod $i$ of piston $c$ with said lever for greater leverage. At about one-half, more or less, of the range of travel of the main piston $c$ in applying the brakes I provide a lateral passage $j$ out of cylinder $b$ into cylinder $e$ behind piston $f$ to be opened for admission of compressed air into cylinder $e$ by piston $c$ about when piston $c$ has applied the brakes sufficiently for the control of a train of empty cars, whereby through the greater leverage of the auxiliary brake-piston greater force may be subsequently applied for loaded trains without much diminution of the pressure of the air, because the further travel of the pistons is slight, owing to the brakes being already on the wheels at the time of such opening of said passage $j$, the aggregate of the travel of both pistons being not more than the travel of a piston $c$ when acting alone with its limited leverage on the loaded train. It will be seen, however, that to operate this system successfully the auxiliary brake-piston $f$ must for economy of compressed air remain at rest until passage $j$ is opened to thus limit its travel to the amount only necessary for applying the superior force after the limit of force by the main piston $c$ has been reached, or thereabout. For this purpose an automatic detachable and attachable connection of some form or other must be provided for the piston-rod $g$ and the brake-lever $d$. This may be accomplished in various ways, and I do not limit myself to any particular way. The preferred contrivance of such apparatus as far as I have provided it at the present time consists of the notched end $k$ of piston-rod $g$, adapted to engage lever $d$ and push it, as shown in Fig. 5, with means to lift or deflect and disconnect said rod and allow lever $d$ to swing back without being engaged by said notch when the brakes are released, which may consist of the cam groove or slot $l$ in the rod running on a fixed deflecting-pin $m$, as in Figs. 4 and 5, or a lateral spur $n$ running over such a fixed deflecting-stud $o$, as in Fig. 7, or any similar or equivalent device. The bore in the end of the cylinder is of course to be large enough for such deflection of the piston-rod, as may be understood by reference to Fig. 6, though the rod in that figure is not subject to deflection. Thus when the brake-cylinders are exhausted and the pistons are returned to normal positions by their respective springs $p$ $q$ the downwardly-turned part of cam-slot $l$ running onto deflecting-pin $m$ in the last part of the return movement of piston $f$ will deflect and disconnect rod $g$ and allow brake-lever $d$ to pass notch $k$ at the termination of the short retiring movement of piston $f$, and thus avoid obstruction to the further retiring movement of lever $d$ by the longer travel of piston $c$ and the longer sweep of said lever along rod $g$, as seen in Fig. 4, and in like manner the spur $n$, if used as shown in Fig. 7, riding up pin $o$ will deflect the notched piston-rod $g$ for the same purpose.

Another means of such automatic connection and disconnection of the auxiliary piston and brake-lever $d$ is represented in Fig. 6. In this case there is an extensible piston-rod consisting of the tubular part $s$, connected to the piston, and the toothed rack-bar $t$, sliding in said tubular part and having a forked end $u'$ for connection with the brake-lever $d$ by a pin or other means. On the extremity of tubular part $s$, which reaches through the cylinder end when piston $f$ is in its most retired position, a gravitating dog $u$ is carried by a bracket $v$, which when piston $f$ begins its forward movement and carries the tail $w$ of said dog away from the end of the cylinder drops into engagement with the teeth of the rack-bar and forces it along, and when piston $f$ retires and the tail $w$ strikes the end of the cylinder again the dog swings out of connection with said teeth and permits the return of the rack-bar, moved by the brake-lever, within said tubular part $s$ of the rod.

To graduate the admission of air into the auxiliary brake-cylinder proportionately to the gravity of the load to prevent locking the wheels under comparatively light loads and causing them to slide and be injuriously flattened locally, I have provided a controlling-valve $x$ in the passage $j$, which is normally closed by a spring $y$ against admission of air to cylinder $e$ and is subject to the air-pressure in cylinder $b$ for maintaining the closure. The stem $z$ of the valve extends through the valve-case and is subject at its end to an arm 2 of a rock-lever 3, carried on a rock-shaft 4, which arm bears against the end of said stem. The rock-lever has a spring 5 connected at one end to it and connected to a fixed object, with a tension-adjusting nut 6 at its other end, which by its tension tends to open the valve; but such opening is not desired while the gravity of the car is controllable by the air-pressure in the main brake-cylinder. The rock-lever 3 is connected at opposite sides of its axis, respectively, by chains 8 with the truck sand-boards 9, which chains run over guide-pulleys 10, located on the car-body 10$^a$ directly above the sand-boards in such manner that when the cars are not loaded or are lightly loaded and are carried high on springs 11 the chains are held taut and restrain spring 5 and prevent its action, and when loaded and springs 11 are compressed the chains are relaxed proportionately, permitting said spring to open the valve accordingly, and thus graduate the action of the auxiliary brake-piston. If the car should always be loaded evenly from end to end, only one connection of the rock-lever with a sand-board would be required; but as it frequently happens that one end is loaded and the other is light, whereby with only one such connection the valve might be opened too much or not enough, two connections are preferable for equalizing the action.

To prevent unsteady action of valve $x$ by the jolting of the car, I have provided a dash-pot 12, with its piston-rod 13 subject to the lever 2 for controlling it, said dash-pot to be charged with a suitable fluid substance to moderate the action of the piston, said piston having a suitably-contracted passage, as 14, for limited flow of the fluid and provided with a spring for returning it to normal position.

The parts 16 represent the bolsters of the car-trucks supporting the pivots or king-bolts 17, whereon the car-bodies are supported by the trunnions 18.

The air is exhausted from the auxiliary cylinder for the release of the brakes along with the exhaust from the main brake-cylinder and by the usual release-valve, which is indicated at 19.

What I claim as my invention is—

1. In an air-brake, the combination with the brake-lever and the main brake cylinder and piston, of the auxiliary brake cylinder and piston, means for reinforcing the main brake cylinder and piston in the latter part of their stroke by compressed air admitted into the auxiliary cylinder from the main cylinder and means for automatically graduating such admission relatively to the weight of the load.

2. In an air-brake, the combination with the brake-lever and the main brake cylinder and piston, of the auxiliary brake cylinder and piston, means for reinforcing the main brake cylinder and piston in the latter part of their stroke by compressed air admitted into the auxiliary cylinder from the main cylinder, means for automatically graduating such admission relatively to the weight of the car, and means to control such admission relatively to unequal disposition of the load along the car.

3. In an air-brake, the combination with the brake-lever and the main brake cylinder and piston, of the auxiliary brake cylinder and piston, means for reinforcing the main brake cylinder and piston in the latter part of their stroke by compressed air admitted into the said auxiliary cylinder from the main cylinder, a valve for automatically graduating such admission relatively to the weight of the load, and means for controlling said valve by the vertical effect of the load on the car-body springs.

4. In an air-brake, the combination with the brake-lever and the main brake cylinder and piston, of the auxiliary brake cylinder and piston, means for reinforcing the main brake cylinder and piston in the latter part of their stroke by compressed air admitted into the auxiliary cylinder from the main cylinder, a valve for graduating such admission relatively to the weight of the load, and means for controlling said valve by the vertical effect of the load on the car-body springs consisting of the rock-lever having an arm acting on the stem of the valve, spring actuating said rock-lever, and one or more connections of said rock-lever with one or more car-truck sand-boards.

5. In an air-brake, the combination with the brake-lever and the main brake cylinder and piston, of the auxiliary brake cylinder and piston, means for reinforcing the main brake cylinder and piston in the latter part of their stroke by compressed air admitted into the said auxiliary brake-cylinder from the main cylinder, a valve for graduating such admission relatively to the weight of the load, means for controlling said valve by the vertical effect of the load on the car-body springs, and a dash-pot for relieving said valve from the jolting motion of the car-body on the valve-controlling mechanism.

6. In an air-brake, the combination with the brake-lever and the main brake cylinder and piston, of the auxiliary brake cylinder and piston for reinforcing the main brake cylinder and piston in the latter part of their stroke by compressed air admitted from the main brake-cylinder by the main brake-piston to the auxiliary brake-cylinder, automatic attaching and detaching connecting mechanism for connecting the auxiliary piston-rod with the brake-lever in the latter part of the braking range of said lever, and detaching the same in the early part of the return of said lever, and means for admitting compressed air into said auxiliary brake-cylinder in the latter part of the range of the brake-lever.

7. In an air-brake, the combination with the brake-lever and the main brake cylinder and piston, of the auxiliary brake cylinder and piston for reinforcing said main brake cylinder and piston in the latter part of their stroke by compressed air admitted from the main brake-cylinder by the main brake-piston to the auxiliary brake-cylinder, automatic attaching and detaching connecting mechanism for connecting the auxiliary piston-rod with the brake-lever in the latter part of the braking range of said lever and detaching the same in the early part of the return of said lever, said connection of the auxiliary piston-rod being on a greater radius of the brake-lever than the connection of the main piston-rod, and means for admitting compressed air into said auxiliary brake-cylinder in the latter part of the range of the brake-lever.

Signed at New York city this 23d day of October, 1902.

WILLIAM H. SAUVAGE.

Witnesses:
C. SEDGWICK,
J. M. HOWARD.